(12) United States Patent
Griesmer (10) Patent No.: US 12,190,594 B2
(45) Date of Patent: Jan. 7, 2025

(54) COUNTING CROWDS BY AUGMENTING CONVOLUTIONAL NEURAL NETWORK ESTIMATES WITH FIFTH GENERATION SIGNAL PROCESSING DATA

(71) Applicant: AT&T Intellectual Property I, L.P., Atlanta, GA (US)

(72) Inventor: Stephen Griesmer, Westfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 41 days.

(21) Appl. No.: 17/645,041

(22) Filed: Dec. 17, 2021

(65) Prior Publication Data

US 2023/0196782 A1 Jun. 22, 2023

(51) Int. Cl.
| | | |
|---|---|---|
| G06V 20/52 | (2022.01) | |
| B64C 39/02 | (2023.01) | |
| G06T 11/00 | (2006.01) | |
| G06V 10/82 | (2022.01) | |
| G06V 20/17 | (2022.01) | |
| H04W 8/00 | (2009.01) | |
| H04W 24/08 | (2009.01) | |
| B64U 101/30 | (2023.01) | |

(52) U.S. Cl.
CPC ......... G06V 20/53 (2022.01); B64C 39/024 (2013.01); G06T 11/00 (2013.01); G06V 10/82 (2022.01); G06V 20/17 (2022.01); H04W 8/005 (2013.01); H04W 24/08 (2013.01); *B64U 2101/30* (2023.01)

(58) Field of Classification Search
None
See application file for complete search history.

(56) References Cited

U.S. PATENT DOCUMENTS

| | | | | |
|---|---|---|---|---|
| 11,651,602 | B1* | 5/2023 | Tschernezki | G06T 7/0004 |
| | | | | 382/157 |
| 2013/0226543 | A1* | 8/2013 | Ramachandran | H04W 4/029 |
| | | | | 703/2 |
| 2017/0341746 | A1* | 11/2017 | Erickson | B64C 39/024 |
| 2019/0279082 | A1* | 9/2019 | Moloney | G06V 10/776 |
| 2020/0242777 | A1* | 7/2020 | Jiang | G06T 7/11 |

OTHER PUBLICATIONS

M. S. Kaiser et al., "Advances in Crowd Analysis for Urban Applications Through Urban Event Detection," in IEEE Transactions on Intelligent Transportation Systems, vol. 19, No. 10, pp. 3092-3112, Oct. 2018, doi: 10.1109/TITS.2017.2771746.*

Wen, F., Wymeersch, H., Peng, B. et al. "A survey on 5G massive MIMO Localization Digital Signal Processing: A Review Journal", 94 (Nov. 2019): 21-28.

(Continued)

*Primary Examiner* — Heather R Jones (57) ABSTRACT

An example method for estimating a number of individuals present in a crowd includes generating a density map based on an image of a crowd, using a convolutional neural network, augmenting the density map with cellular signal processing data to produce an augmented density map, and estimating a number of individuals present in the crowd, based on the augmented density map.

20 Claims, 4 Drawing Sheets

(56) References Cited

OTHER PUBLICATIONS

Wen, Longyin et al. "Drone-based Joint Density Map Estimation, Localization and Tracking with Space-Time Multi-Scale Attention Network." ArXiv abs/1912.01811 (2019): n. pag.
Koivisto, Mike, Aki Hakkarainen, Mario Costa, Petteri Kela, Kari Leppänen and Mikko Valkama. "High-Efficiency Device Positioning and Location-Aware Communications in Dense 5G Networks." IEEE Communications Magazine 55 (2017): 188-195.
Simonyan, Karen and Andrew Zisserman. "Very Deep Convolutional Networks for Large-Scale Image Recognition." CoRR abs/1409.1556 (2015): n. pag.
Gao, Guangshuai, Junyu Gao, Qingjie Liu, Qi Wang and Yunhong Wang. "CNN-based Density Estimation and Crowd Counting: A Survey." ArXiv abs/2003.12783 (2020): n. pag.
Lempitsky, Victor S. and Andrew Zisserman. "Learning to Count Objects in Images." NIPS (2010).

\* cited by examiner

COUNTING CROWDS BY AUGMENTING CONVOLUTIONAL NEURAL NETWORK ESTIMATES WITH FIFTH GENERATION SIGNAL PROCESSING DATA

The present disclosure relates generally to crowd counting, and relates more particularly to devices, non-transitory computer readable media, and methods for counting crowds by augmenting convolutional neural networks (CNN) estimates with Fifth Generation (5G) signal processing data.

BACKGROUND

The ability to correctly estimate the size of a crowd from a still image or video may prove useful in a variety of contexts. For instance, knowing the size of a crowd may help with determining the demand for business, sizing celebrations (e.g., parades) or protests, and providing warnings during global pandemics. Crowd counting techniques can also be used to count objects in general and may thus have further utility in fields like biology, ecology, and climate studies.

SUMMARY

An example method performed by a processing system including at least one processor includes generating a density map based on an image of a crowd, using a convolutional neural network, augmenting the density map with cellular signal processing data to produce an augmented density map, and estimating a number of individuals present in the crowd, based on the augmented density map.

An example system includes a processing system including at least one processor and a computer readable medium storing instructions which, when executed by the processing system, cause the processing system to perform operations. The operations include generating a density map based on an image of a crowd, using a convolutional neural network, augmenting the density map with cellular signal processing data to produce an augmented density map, and estimating a number of individuals present in the crowd, based on the augmented density map.

An example computer readable medium stores instructions which, when executed by a processing system including at least one processor, cause the processing system to perform operations. The operations include generating a density map based on an image of a crowd, using a convolutional neural network, augmenting the density map with cellular signal processing data to produce an augmented density map, and estimating a number of individuals present in the crowd, based on the augmented density map.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and devices for counting crowds by augmenting convolutional neural networks (CNN) estimates with Fifth Generation (5G) signal processing data. As discussed above, the ability to correctly estimate the size of a crowd from a still image or video may prove useful in a variety of contexts. For instance, knowing the size of a crowd may help with determining the demand for business, sizing celebrations (e.g., parades) or protests, and providing warnings during global pandemics. More specifically, knowing the size of a crowd may allow businesses and/or organizations to ensure that sufficient resources are available to manage and provide for the crowd, or to provide crowd control (e.g., during pandemics, for safety reasons, and/or in other situations where the size of a crowd may need to be limited).

Deep learning and CNNs have shown promising results in supervised learning situations for particular venues such as shopping malls, sidewalks, concert halls, technology conferences, and sporting events. However, the utility of CNNs is limited by the CNNs' need for large numbers of training samples with ground truth estimates. While images of crowds are not rare, the numbers of individuals in very dense training images is often difficult to determine. CNN-based estimates can also be limited by occlusions, varying densities due to perspective, and lighting.

Examples of the present disclosure augment CNN crowd counting estimates with 5G signal processing data. In one example, a CNN-based image of a crowd may be used to generate an initial estimate of the number of individuals in the crowd. 5G antennas may subsequently be used to sample the density of the crowd at different locations within the crowd in order to refine the density map and the initial estimate. 5G antenna and wavelength technology is capable of locating connected individuals and mobile objects to within meters, and sometimes centimeters, of their true locations. Massive multiple input multiple output (MIMO) communication systems are being deployed to allow low latency communications to network edges. An additional benefit of MIMO systems is that the systems can locate mobile devices more precisely due to the additional communication channels associated with each distributed set of antennas.

The 5G antennas may comprise fixed-location antennas that are directed at a specific area, or the 5G antennas may be spatially positioned to obtain the best estimate of the size of a crowd. The most effective and efficient distribution of antennas could be determined experimentally. However, fixed-location structures with transmitters may also help to align CNN-based images with 5G position estimates, and may also be able to be located through non-line-of-sight signals without the need for additional transmitters.

Although 5G antenna density is still relatively sparse, 5G antenna density is steadily increasing. Until such time as the antenna density (and the number of mobile subscribers using 5G-enabled devices) may allow for crowd counting using 5G signal processing data as the primary (or even exclusive) means of estimation, the 5G signal processing data provides a promising way to augment state of the art CNN-based crowd counting techniques.

Although examples of the present disclosure are described within the context of 5G networks and leveraging 5G signal processing data to augment crowd counting CNNs, it will be appreciated that the examples of the present disclosure could be extended to any cellular network architecture that includes a location management function or similar network function, including hybrid fourth generation (4G)/5G networks, sixth generation (6G) networks, and other future generation networks. Thus, in some examples, 5G signal processing data may be referred to simply as "cellular signal processing data."

Figure 1:
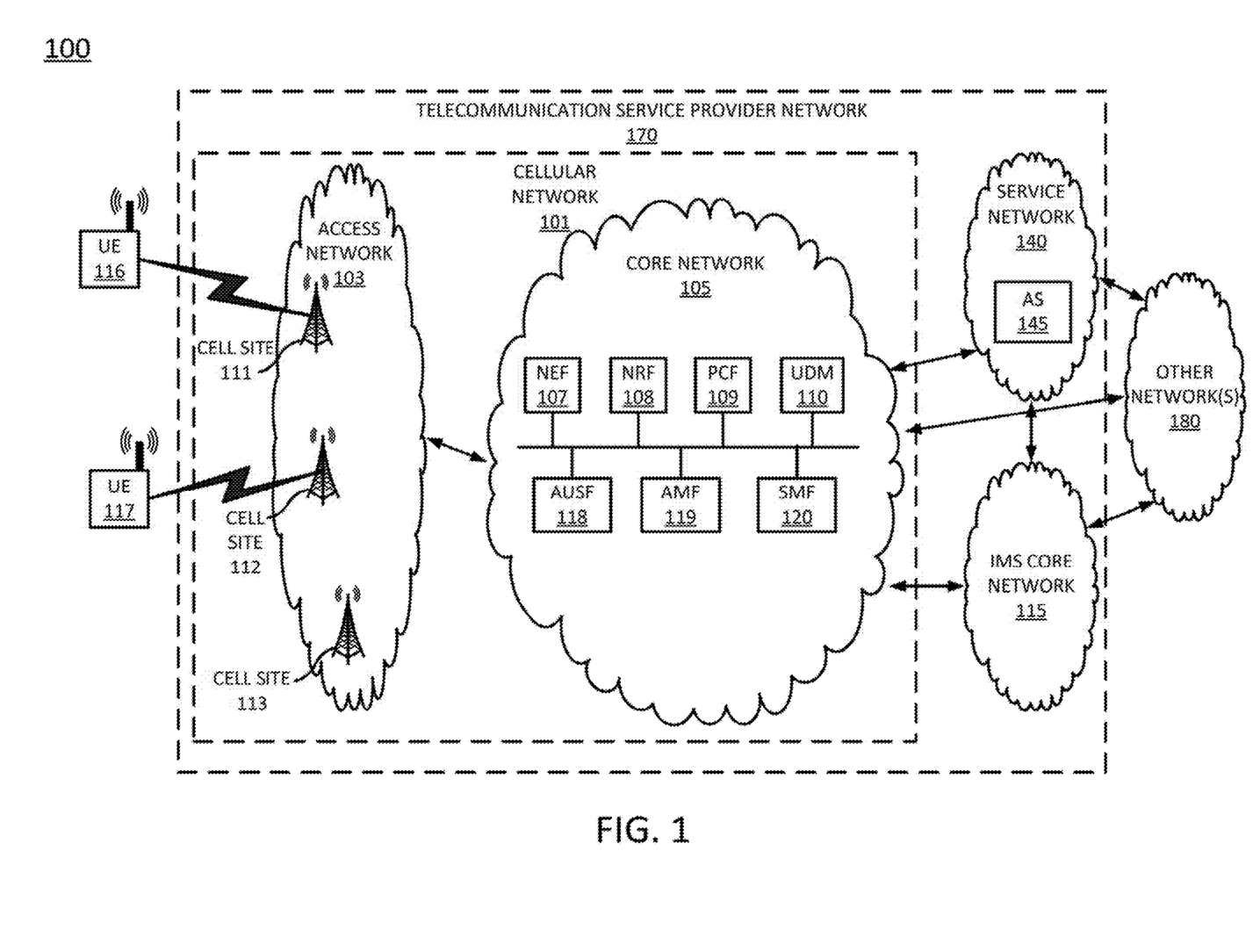
FIG. 1 illustrates an example network, or system in which examples of the present disclosure for estimating a number of individuals present in a crowd may operate.

To better understand the present disclosure, FIG. 1 illustrates an example network, or system 100 in which examples of the present disclosure for estimating a number of individuals present in a crowd may operate. In one example, the system 100 includes a telecommunication service provider network 170. The telecommunication service provider network 170 may comprise a cellular network 101 (e.g., a 4G/Long Term Evolution (LTE) network, a 4G/5G hybrid network, a 5G network, or the like), a service network 140, and a core network, e.g., an IP Multimedia Subsystem (IMS) core network 115. The system 100 may further include other networks 180 connected to the telecommunication service provider network 105. FIG. 1 also illustrates various mobile endpoint devices 116 and 117, e.g., user equipment or user endpoints (UE). The mobile endpoint devices UE 116 and UE 117 may each comprise a cellular telephone, a smartphone, a tablet computing device, a laptop computer, a pair of computing glasses, a wireless enabled wristwatch, or any other cellular-capable mobile telephony and computing devices (broadly, "mobile endpoint devices"). In one example, at least some of the UEs 116 and 117 are 5G-enabled devices (i.e., devices that support 5G mobile technology).

In one example, the cellular network 101 may comprise an access network 103 and a core network 105. The core network may be an Evolved Packet Core (EPC) network in the case of a 4G implementation, or a 5G core network in the case of a 5G implementation. In one example, the access network 103 comprises a cloud RAN. For instance, a cloud RAN is part of the 3$^{rd}$ Generation Partnership Project (3GPP) 5G specifications for mobile networks. As part of the migration of cellular networks towards 5G, a cloud RAN may be coupled to an EPC network until new cellular 5G core networks are deployed in accordance with 5G specifications. In one example, access network 103 may include cell sites 111 and 112 and a baseband unit (BBU) pool (not shown). In a cloud RAN, radio frequency (RF) components, referred to as remote radio heads (RRHs), may be deployed remotely from baseband units, e.g., atop cell site masts, buildings, and so forth. In one example, the BBU pool may be located at distances as far as 20-80 kilometers or more away from the antennas/remote radio heads of cell sites 111 and 112 that are serviced by the BBU pool. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site, may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 113 may include RRH and BBU components. Thus, cell site 113 may comprise a self-contained "base station." With regard to cell sites 111 and 112, the "base stations" may comprise RRHs at cell sites 111 and 112 coupled with respective baseband units of the BBU pool.

In one example, the core network 105 provides various functions that support wireless services in the 5G environment. Examples of the present disclosure leverage 5G network infrastructure and protocols to enable greater precision when counting crowds. For instance, 3GPP release 16 includes new positioning reference signals and a new location management function (LMF) which can hold 5G location information for input to a crowd counting CNN. However, it will be appreciated that most core networks do not currently rely exclusively (or, in some cases, even mainly) on 5G technology. Thus, although examples of the present disclosure anticipate deployment in fully 5G environments, practical implementations of such examples may, for a time, be deployed in hybrid environments which are still transitioning to 5G. Such hybrid environments may rely on a combination of 5G and other wireless technologies, such as LTE.

Thus, in one example, core network 105 is an Internet Protocol (IP) packet core network that supports both real-time and non-real-time service delivery across a 5G or hybrid network, e.g., as specified by the 3GPP standards. In operation, mobile endpoint device UE 116 may access wireless services via the cell site 111 and mobile endpoint device UE 117 may access wireless services via the cell site 112 located in the access network 103. It should be noted that any number of cell sites can be deployed in access network. In one illustrative example, the access network 103 may comprise one or more cell sites.

In core network 105, network functions (NFs) support various functions as part of the cellular network 101. For example, the control plane of the core network 105 may include a network exposure function (NEF) 107, a network repository function (NRF) 108, a policy control function (PCF) 109, a unified data management (UDM) function 110, an authentication server function (AUSF) 118, an access and management mobility function (AMF) 119, and a session management function (SMF) 120.

In operation, the mobile endpoint device UE 116 or the mobile endpoint device UE 117 may connect over the access network 103 to the EPC network 105, where the AMF 119 serves as a single entry point for the connection. The AMF 119 may select an SMF 120 for managing the mobile endpoint UE session based on the service requested by the mobile endpoint device UE 116 or the mobile endpoint device UE 117. The AUSF 118 may allow the AMF 119 to authenticate the mobile endpoint device UE 116 or the mobile endpoint device UE 117 to access the services of the core network 105. The SMF 120, PCF 109, and UDM function 110, as well as other functions, may provide a policy control framework. It should be noted that the core network 105 has been simplified for ease of illustration.

In one example, service network 140 may comprise one or more devices, such as application server (AS) 145 for providing services to subscribers, customers, and or users. For example, telecommunication service provider network 170 may provide a cloud storage service, web server hosting, social media applications, and other services. As such, service network 140 may represent aspects of telecommunication service provider network 170 where infrastructure for supporting such services may be deployed. In one example, AS 145 may comprise all or a portion of a computing device or system, such as computing system 600, and/or processing system 602 as described in connection with FIG. 6 below, specifically configured to provide one or more service functions in accordance with the present disclosure. For instance, AS 145 may be configured to perform various operations in connection with estimating a number of individuals present in a crowd, and for performing various other operations in accordance with the present disclosure. For instance, AS 145 may execute a convolutional neural network that converts images of crowds to density maps. The AS 145 may further augment the density maps with 5G signal processing data.

Although a single application server, AS 145, is illustrated in service network 140, it should be understood that service network 140 may include any number of components to support one or more services that may be provided to one or more subscribers, customers, or users by the telecommunication service provider network 170. Similarly, functions described herein with respect to AS 145 may alternatively or additional be provided by an application server within the EPC network 105.

In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general.

In accordance with the present disclosure, any one or more of the components of core network 105 may comprise network function virtualization infrastructure (NFVI), e.g., SDN host devices (i.e., physical devices) configured to operate as various virtual network functions (VNFs). In this regard, the EPC network 105 may be expanded (or contracted) to include more or fewer components than the state of EPC network 105 that is illustrated in FIG. 1.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

Figure 6:
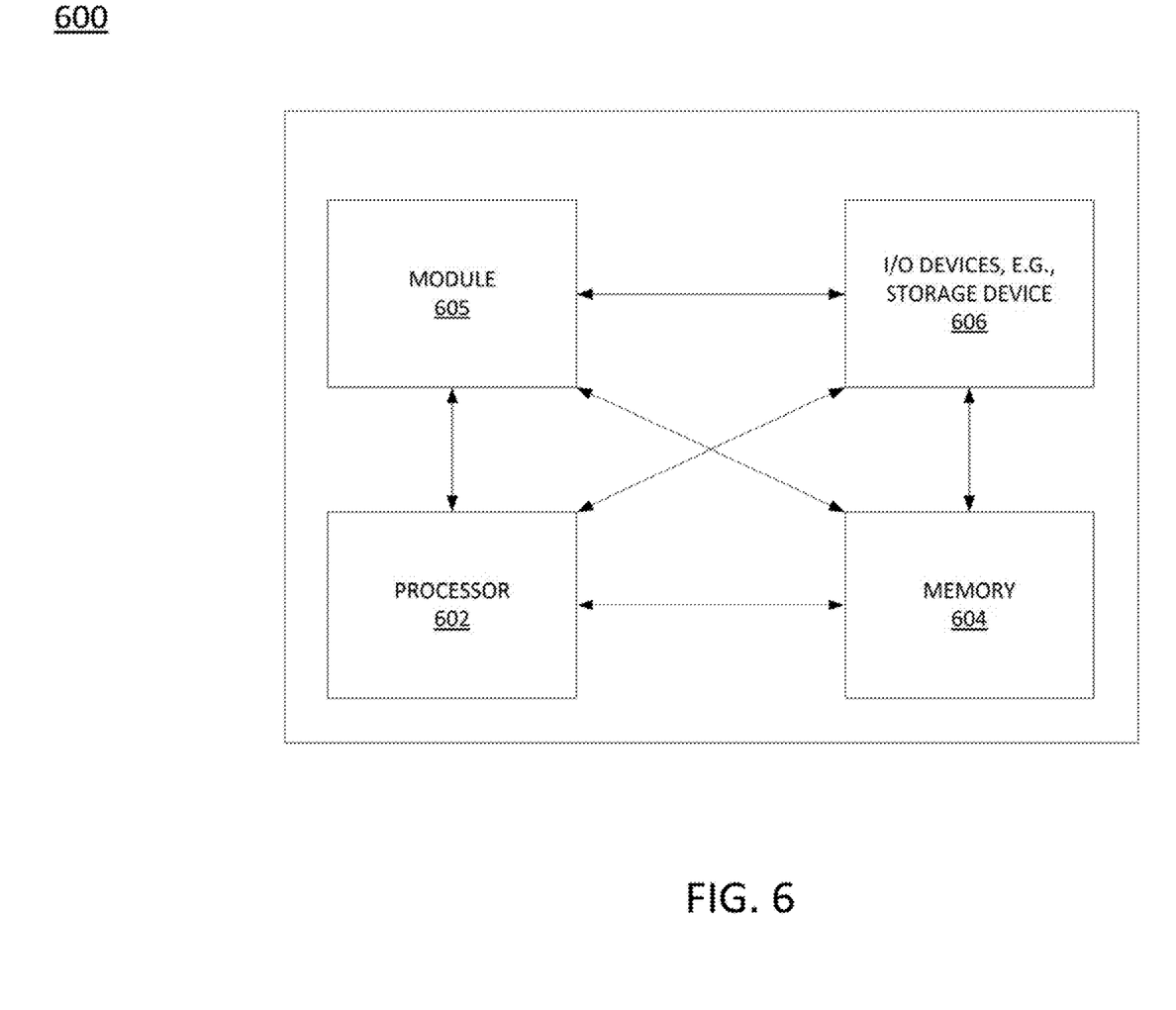
FIG. 6 illustrates an example of a computing device, or computing system, specifically programmed to perform the steps, functions, blocks, and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure.

Figure 2:
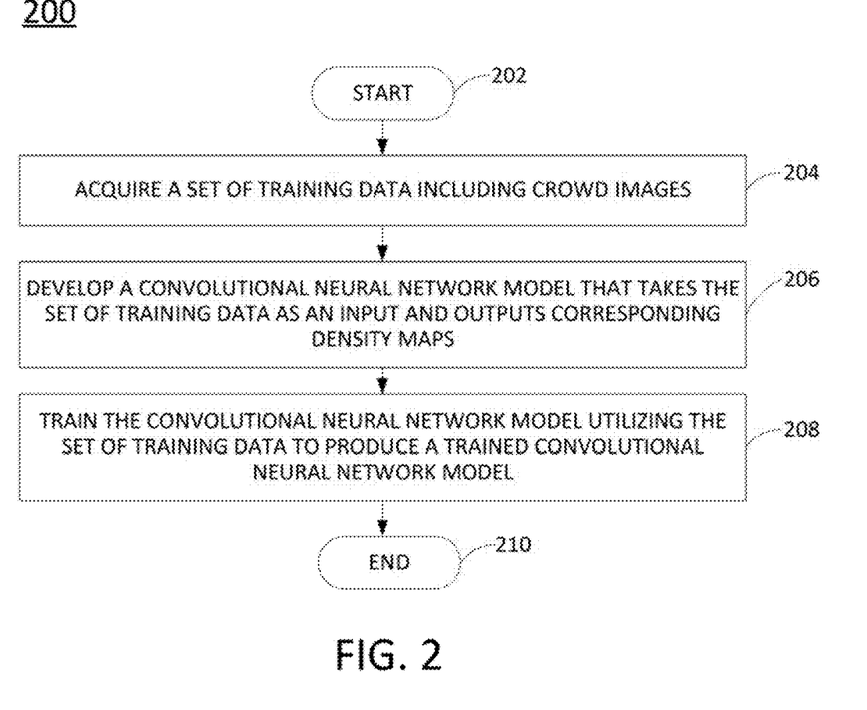
FIG. 2 illustrates a flowchart of an example method for training a convolutional neural network model to estimate a number of individuals present in a crowd, in accordance with the present disclosure.

FIG. 2 illustrates a flowchart of an example method 200 for training a convolutional neural network (CNN) model to estimate a number of individuals present in a crowd, in accordance with the present disclosure. In one example, steps, functions and/or operations of the method 200 may be performed by a device as illustrated in FIG. 1, e.g., an application server, or any one or more components thereof. In one example, the steps, functions, or operations of the method 200 may be performed by a computing device or system 600, and/or a processing system 602 as described in connection with FIG. 6 below. For instance, the computing device 600 may represent at least a portion of an application server in accordance with the present disclosure. For illustrative purposes, the method 200 is described in greater detail below in connection with an example performed by a processing system.

The method 200 begins in step 202. In step 204, the processing system may acquire a set of training data including crowd images. In one example, the set of training data comprises a plurality of crowd images, where the plurality of crowd images may include still photos and/or individual frames of video. In one example, each crowd image may be annotated to indicate the locations of the heads of individuals who are depicted in the crowd image.

Figure 3:
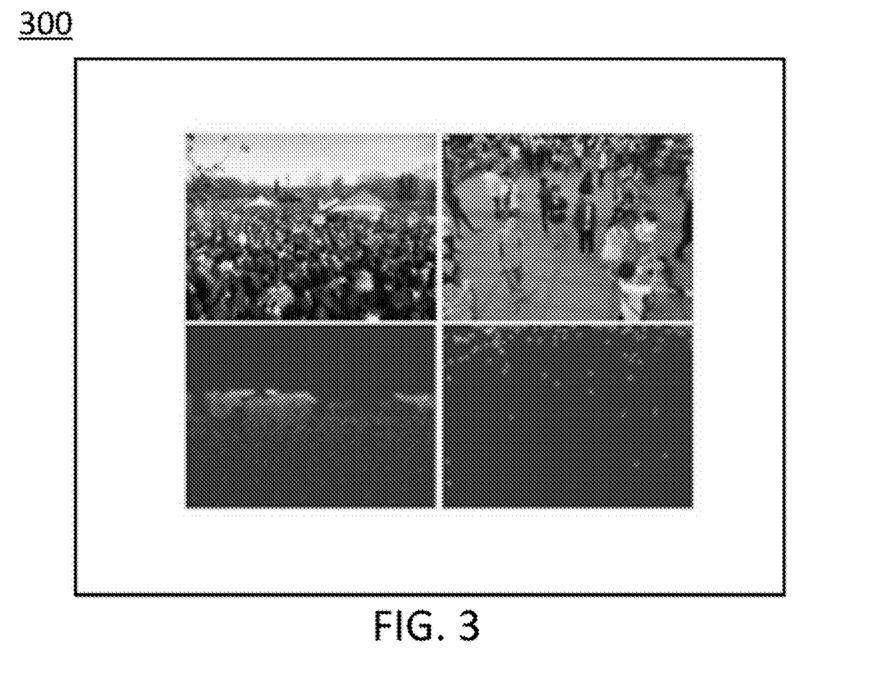
FIG. 3 illustrates two example crowd images and the density maps corresponding to the example crowd images.

In step 206, the processing system may develop a convolutional neural network (CNN) model that takes the set of training data as an input and outputs corresponding density maps. More specifically, the CNN model may convert an input crowd image to a density map (e.g., through a transformation function such as a Gaussian transformation message). FIG. 3, for instance, illustrates two example crowd images (i.e., the top two images of FIG. 3) and the density maps (i.e., the bottom two images of FIG. 3) corresponding to the example crowd images. In one example, the CNN model may comprise an image-based CNN; however, in other examples, other types of CNNs may be implemented (e.g., basic CNNs, single-column CNNs, multi-column, CNNs, etc.). Development of the CNN model may comprise supervised training of the CNN model on the annotated crowd images in the set of training data.

In one example, development of the CNN model further comprises an augmentation of the CNN model to incorporate 5G signal processing data. In one example, the 5G signal processing data may comprise the locations of 5G-enabled user endpoint devices that are present in the crowds depicted in the crowd images. For smaller crowds, it may be possible to capture the locations of all of the 5G-enabled user endpoint devices; however, for larger crowds, there may not be enough antennas (even in dense MIMO environments) to capture the locations of all of the 5G-enabled user endpoint devices. In the latter case, the processing system may focus on the subsets of the depicted crowds that have the highest crowd density (e.g., greatest number of individuals and/or 5G-enabled user endpoint devices), as those subsets are likely to experience occlusions.

In one example, the processing system may receive a plurality of crowd images as input for the CNN model. The plurality of crowd images may be sent to the processing system via 5G links or separate communication links. The processing system may then align each crowd image with the corresponding locations of the 5G-enabled user endpoint devices, e.g., such that for each crowd image, the locations of the 5G-enabled user endpoint devices that are present in the crowd image are identified. In one example, alignment may be achieved by positioning transmitters on stationary structures or by determining the coordinates of the stationary structures from non-line-of-sight signals captured from 5G-enabled user endpoint devices. For instance, transmitters and cameras may be located in fixed positions throughout an area in which a crowd may be expected to form (e.g., a park, a stadium, a concert venue, etc.). In this case, the transmitters may be positioned to optimize effectiveness in crowd counting by providing line-of-sight for large metropolitan spaces in which crowds are most likely to gather.

In another example, however, mobile devices may be utilized which are capable of capturing both images and 5G signals. For instance, an unmanned aerial vehicle (e.g., a drone) may be equipped with a transmitter and a camera and may be capable of capturing images and 5G signals from various non-fixed locations. An added benefit of utilizing the same device to capture the images and the 5G signals is that the crowd images and locations of the 5G-enabled user endpoint devices will be aligned without the need for further processing by the processing system.

Figure 4:
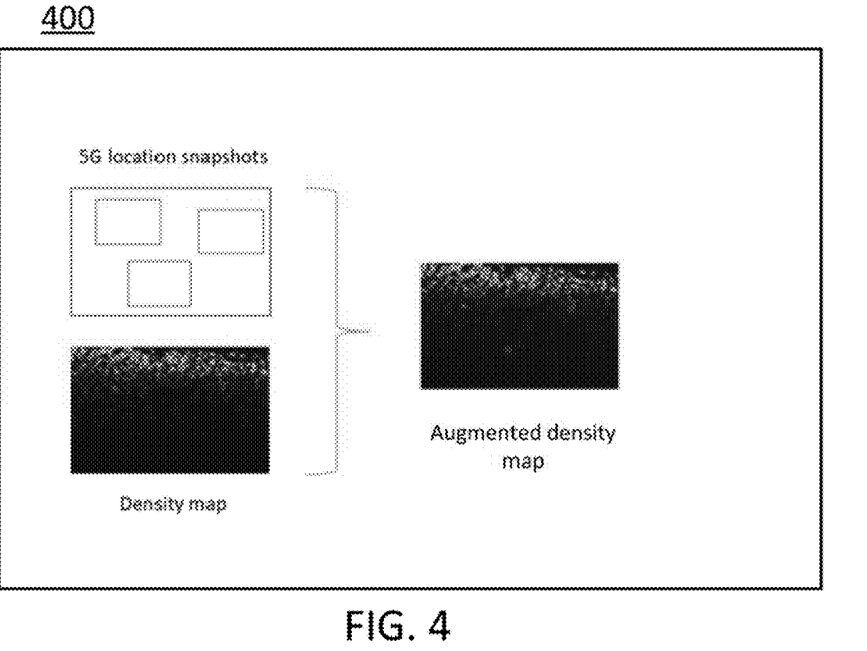
FIG. 4 illustrates how a plurality of Fifth Generation location "snapshots" extracted from Fifth Generation signal processing data may be used to augment a given density map to include one or more false negatives, resulting in an augmented density map.

In one example, the 5G signal processing data may be incorporated as a transformation layer on the density maps that are output by the CNN model. In this case, the transformation layer may compare the location points from the 5G signal processing data from the perspective of a given crowd image and may add density points that correspond to false negatives in the output density map corresponding to the given crowd image. FIG. 4, for example, illustrates how a plurality of 5G location "snapshots" extracted from 5G signal processing data may be used to augment a given density map (output from the CNN model) to include one or more false negatives, resulting in an augmented density map. Although not shown in the 5G location snapshots, each snapshot may include one or more markers that show the location of one or more detected 5G signals. For instance, a marker may circle the location of a detected 5G signal in a snapshot.

Within the context of the present disclosure, a "false negative" is understood to refer to an individual who is present in a crowd depicted in a crowd image, and who is carrying a 5G-enabled user endpoint device on their person, but who is not represented in the output density map corresponding to the crowd image. It should be noted that false positives (i.e., density points in the output density map which do not correspond to individuals who are present in the crowd) are difficult to eliminate using location points from 5G signal processing data, because some individuals who are present in the crowd may not be carrying 5G-enabled user endpoint devices on their persons (and, thus, cannot be ruled out based on 5G signal processing data alone). Over time, however, and as 5G antenna density increases, it may become easier to filter false positives using 5G signal processing data.

In step 208, the processing system may train the CNN model utilizing the set of training data to produce a trained CNN model. In one example, training of the CNN model includes adjusting the parameters of the 5G transformation layer as the CNN model is trained (i.e., training the CNN model together or simultaneously with the adjusting of the 5G transformation layer). As an example, a parameter of the 5G transformation layer that may be adjusted in step 208 is a threshold value for determining when the crowd count should be increased based on the detection of an individual in the 5G signal processing data. Thus, the 5G transformation layer may make the determination as to whether to treat an individual who is detected in the 5G signal processing data as a newly detected (e.g., not already counted based on the crowd image) individual (which would necessitate increasing the crowd count) or as a previously detected (e.g., already counted based on the crowd image) individual (which would not necessitate increasing the crowd count). Training the CNN model and adjusting the parameters of the 5G transformation layer together may allow for easier detection of problems with the manual annotations of the crowd images in the set of training data, and may also help to automate the annotation of the crowd images. Line-of-sight issues that may affect the accuracy of the 5G signal processing data may also be more easily detected.

The method 200 may end in step 210.

Figure 5:
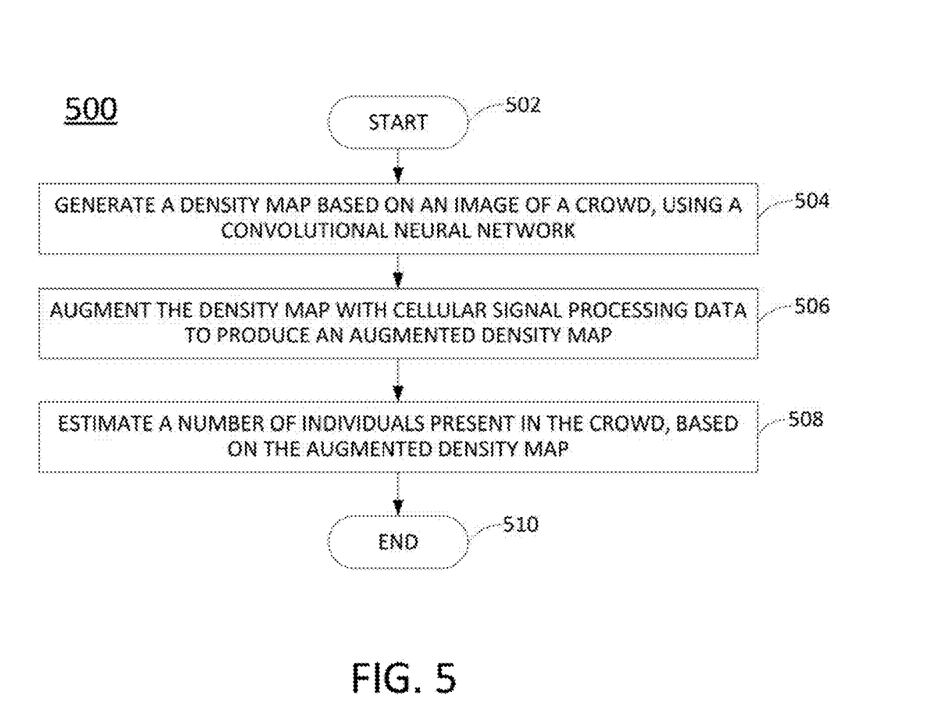
FIG. 5 illustrates a flowchart of an example method for estimating a number of individuals present in a crowd, in accordance with the present disclosure.

FIG. 5 illustrates a flowchart of an example method 500 for estimating a number of individuals present in a crowd, in accordance with the present disclosure. As such, in one example, steps, functions and/or operations of the method 500 may be performed by a device as illustrated in FIG. 1, e.g., an application server, or any one or more components thereof. In one example, the steps, functions, or operations of the method 500 may be performed by a computing device or system 600, and/or a processing system 602 as described in connection with FIG. 6 below. For instance, the computing device 600 may represent at least a portion of an application server in accordance with the present disclosure. For illustrative purposes, the method 500 is described in greater detail below in connection with an example performed by a processing system.

The method 500 begins in step 502. In step 504, the processing system may generate a density map based on an image of a crowd, using a convolutional neural network (CNN). In one example, the image of the crowd may comprise a photo or an individual frame of a video (i.e., where the video may comprise multiple such frames arranged in a sequence). The crowd depicted in the image may comprise a plurality of individuals (e.g., people, but in other examples, "individuals" may refer to animals, vehicles, machines, or other non-human subjects). For instance, the plurality of individuals may comprise a crowd gathered in a park, at a concert or sporting event, in a shopping mall, or the like. The crowd image may be captured by a camera (or other types of image capturing device) that is present at the location of the crowd. The crowd image may be transmitted by the camera to the processing system in real time (e.g., without little to no delay save for network latency between capture of the crowd image by the camera and transmission of the crowd image to the processing system), or the crowd image may be stored and obtained from storage by the processing system at some time after the capture of the crowd image by the camera (e.g., x minutes, hours, or days later).

In one example, the CNN comprises an image-based CNN that has been trained to convert an image to a density map. For instance, the density map that is output by the CNN may comprise a plurality of points, where each point may represent an individual who is depicted in the image. Denser clusters of points in the density map may indicate denser areas of the crowd depicted in the crowd image, while sparser clusters of points or solitary points may indicate areas of the crowd which are more spread out.

In step 506, the processing system may augment the density map with cellular (e.g., Fifth Generation (5G)) signal processing data to produce an augmented density map. In one example, 5G signal processing data may be captured by one or more transmitters which capture signals from 5G-enabled user endpoint devices carried by some of the individuals of the plurality of individuals. For instance, some of the people in a crowd may carry 5G-enabled mobile phones.

In one example, the augmented density map adds points to the density map output by the CNN by including false negatives in the augmented density map. As discussed above, a false negative may represent an individual in the crowd whose presence was not represented in the density map output by the CNN, but whose presence can be verified by virtue of a 5G signal that is captured from a user endpoint device that is carried by the individual.

As discussed above, in one example, the augmentation of step 506 may be achieved by incorporating the 5G signal processing data as a transformation layer on the density map that is output by the CNN. The transformation layer may align the 5G signal data with the density map that is output by the CNN. Alignment may rely on knowledge of the locations of fixed-location 5G-enabled transmitters, or may be inherent where the image of the crowd and the 5G signal data are captured by the same device (e.g., an unmanned aerial vehicle).

In step 508, the processing system may estimate a number of individuals present in the crowd, based on the augmented density map. In one example, estimating the number of individuals based on the augmented density map may involve laying the location of the crowd out on a grid, and estimating the number of individuals present in each cell or rectangle of the grid based on the augmented density map. However, there may be portions of the crowd that are present in the location, but not visible in the crowd images. In this case, the densities of nearby cells of the grid may be used to estimate density in hidden (or not imaged) areas, and/or 5G signal processing data may be used to augment the image information. In one example, because counting the number of people in an image is not the same as counting a live crowd, the processing system may estimate the number of individuals present in the crowd by processing a plurality of augmented density maps, where the plurality of augmented density maps may include augmented density maps derived from images of the crowd which were captured from multiple different perspectives.

In one example, estimating the number of individuals may be performed systematically, for instance by using unmanned aerial vehicles to capture video images and 5G signals from various locations within a very large crowd. In this case, the capture of the video images may also help to account for crowd movement, which may allow the number of individuals to be estimated with greater accuracy. 5G signal data may also be used to record the trajectory of moving individuals within a crowd.

The method 500 may end in step 510.

Thus, by utilizing available 5G signal processing data to augment CNN-based techniques, examples of the present disclosure may be able to more accurately estimate the size of a crowd. As discussed above, knowing the size of a crowd may allow businesses and/or organizations to ensure that sufficient resources are available to manage and provide for the crowd, or to provide crowd control (e.g., during pandemics, for safety reasons, and/or in other situations where the size of a crowd may need to be limited). In further examples, telecommunications service providers may be able to integrate the disclosed techniques with emergency services (e.g., first responder services) in order to improve emergency responses. Furthermore, in one embodiment the use of the crowd images and 5G signals is limited to only estimating a count of a crowd for a specific location. Thus, these collected crowd images and 5G signals are not used for any other purposes and any information for a specific individual is not intended to be captured or stored without prior authorization by the individual and/or being compliant with pertinent federal, state, or local ordinance or law.

Although not specifically specified, one or more steps, functions or operations of the respective methods 200 or 500 may include a storing, displaying and/or outputting step as required for a particular application. In other words, any data, records, fields, and/or intermediate results discussed in the method can be stored, displayed and/or outputted either on the device executing the method or to another device, as required for a particular application. Furthermore, steps, blocks, functions or operations in any of FIGS. 2 and 5 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the example examples of the present disclosure.

FIG. 6 depicts a high-level block diagram of a computing device or processing system specifically programmed to perform the functions described herein. As depicted in FIG. 6, the processing system 600 comprises one or more hardware processor elements 602 (e.g., a central processing unit (CPU), a microprocessor, or a multi-core processor), a memory 604 (e.g., random access memory (RAM) and/or read only memory (ROM)), a module 605 for estimating a number of individuals present in a crowd, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if any one or more of the methods 200 and 500 as discussed above are implemented in a distributed or parallel manner for a particular illustrative example, i.e., the steps of the above methods 200 and 500, respectively, or each of the entire methods 200 and 500, respectively, is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 602 can also be configured or programmed to cause other devices to perform one or more operations as discussed above. In other words, the hardware processor 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed methods 200 and 500. In one example, instructions and data for the present module or process 605 for estimating a number of individuals present in a crowd (e.g., a software program comprising computer-executable instructions) can be loaded into memory 604 and executed by hardware processor element 602 to implement the steps, functions or operations as discussed above in connection with the illustrative methods 200 and 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 605 for estimating a number of individuals present in a crowd (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   generating, by a processing system including at least one processor, a density map based on an image of a crowd, using a convolutional neural network;
   augmenting, by the processing system, the density map with cellular signal processing data to produce an augmented density map, wherein the augmenting comprises incorporating the cellular signal processing data as a transformation layer on the density map that is output by the convolutional neural network, wherein the transformation layer is separate from the convolutional neural network, wherein a parameter of the transformation layer is adjusted simultaneously with training of the convolutional neural network, and wherein the parameter comprises a threshold value for determining when an estimate of a number of individuals present in the crowd is to be increased in response to a detection of an individual in the cellular signal processing data; and
   estimating, by the processing system, a number of individuals present in the crowd, based on the augmented density map.

2. The method of claim 1, wherein the convolutional neural network comprises an image-based convolutional neural network that takes the image of the crowd as an input and produces the density map as an output.

3. The method of claim 1, wherein the density map comprises a plurality of points, and wherein each point of the plurality of points represents an individual of the number of individuals who is depicted in the image of the crowd.

4. The method of claim 3, wherein the augmented density map adds new points to the plurality of points of the density map by including one or more false negatives.

5. The method of claim 1, wherein the cellular signal processing data is captured from user endpoint devices carried by some of the individuals of the number of individuals.

6. The method of claim 1, wherein the transformation layer aligns the cellular signal processing data with the density map that is output by the convolutional neural network.

7. The method of claim 1, wherein the augmenting relies on knowledge of locations of fixed-location transmitters which are located in a vicinity of the crowd.

8. The method of claim 1, wherein the estimating is based on a plurality of augmented density maps including the augmented density map.

9. The method of claim 8, wherein the plurality of augmented density maps depicts the crowd from a plurality of different perspectives.

10. The method of claim 1, wherein the image of the crowd is obtained from a camera, and the cellular signal processing data is obtained from a fixed location transmitter that is separate from the camera.

11. The method of claim 1, wherein the image of the crowd and the cellular signal processing data are obtained from a same device.

12. The method of claim 11, wherein the same device is an unmanned aerial vehicle.

13. The method of claim 1, wherein the cellular processing data is produced by a plurality of mobile user endpoint devices carried by some individuals of the number of individuals.

14. The method of claim 1, wherein the cellular signal processing data comprises fifth generation signal processing data.

15. The method of claim 1, wherein the estimate of the number of individuals present in the crowd is to be increased in response to the detection of the individual in the cellular signal processing data when the threshold value indicates that the individual was not previously accounted for in the density map that is output by the convolutional neural network, and wherein the estimate of the number of individuals present in the crowd is to remain at a current number in response to the detection of the individual in the cellular signal processing data when the threshold value indicates that the individual was previously accounted for in the density map that is output by the convolutional neural network.

16. A system comprising:
 a processing system including at least one processor; and
 a computer-readable medium storing instructions which, when executed by the processing system, cause the processing system to perform operations, the operations comprising:
  generating a density map based on an image of a crowd, using a convolutional neural network;
  augmenting the density map with cellular signal processing data to produce an augmented density map, wherein the augmenting comprises incorporating the cellular signal processing data as a transformation layer on the density map that is output by the convolutional neural network, wherein the transformation layer is separate from the convolutional neural network, wherein a parameter of the transformation layer is adjusted simultaneously with training of the convolutional neural network, and wherein the parameter comprises a threshold value for determining when an estimate of a number of individuals present in the crowd is to be increased in response to a detection of an individual in the cellular signal processing data; and
  estimating a number of individuals present in the crowd, based on the augmented density map.

17. A non-transitory computer-readable medium storing instructions which, when executed by a processing system including at least one processor, cause the processing system to perform operations, the operations comprising:
 generating a density map based on an image of a crowd, using a convolutional neural network;
 augmenting the density map with cellular signal processing data to produce an augmented density map, wherein the augmenting comprises incorporating the cellular signal processing data as a transformation layer on the density map that is output by the convolutional neural network, wherein the transformation layer is separate from the convolutional neural network, wherein a parameter of the transformation layer is adjusted simultaneously with training of the convolutional neural network, and wherein the parameter comprises a threshold value for determining when an estimate of a number of individuals present in the crowd is to be increased in response to a detection of an individual in the cellular signal processing data; and
 estimating a number of individuals present in the crowd, based on the augmented density map.

18. The non-transitory computer-readable medium of claim 17, wherein the convolutional neural network comprises an image-based convolutional neural network that takes the image of the crowd as an input and produces the density map as an output.

19. The non-transitory computer-readable medium of claim 17, wherein the density map comprises a plurality of points, wherein each point of the plurality of points represents an individual of the number of individuals who is depicted in the image of the crowd, and wherein the augmented density map adds new points to the plurality of points of the density map by including false negatives.

20. The non-transitory computer-readable medium of claim 17, wherein the transformation layer aligns the cellular signal processing data with the density map that is output by the convolutional neural network.

\* \* \* \* \*